United States Patent
Kaluza et al.

(10) Patent No.: US 12,545,104 B2
(45) Date of Patent: Feb. 10, 2026

(54) METHOD, DEVICE, COMPUTER PROGRAM AND COMPUTER-READABLE STORAGE MEDIUM FOR CONTROLLING THE PROVISION OF SUGGESTION INFORMATION TO A VEHICLE OCCUPANT OF A VEHICLE

(71) Applicant: Bayerische Motoren Werke Aktiengesellschaft, Munich (DE)

(72) Inventors: Sebastian Kaluza, Munich (DE); Fabian Beste, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 242 days.

(21) Appl. No.: 18/247,547

(22) PCT Filed: Jul. 19, 2021

(86) PCT No.: PCT/EP2021/070076
§ 371 (c)(1),
(2) Date: Mar. 31, 2023

(87) PCT Pub. No.: WO2022/096165
PCT Pub. Date: May 12, 2022

(65) Prior Publication Data
US 2024/0010070 A1    Jan. 11, 2024

(30) Foreign Application Priority Data
Nov. 3, 2020   (DE) ............. 10 2020 128 852.2

(51) Int. Cl.
*B60K 35/00*   (2024.01)
*B60K 35/23*   (2024.01)
(Continued)

(52) U.S. Cl.
CPC .............. *B60K 35/00* (2013.01); *B60K 35/23* (2024.01); *B60K 35/265* (2024.01); *B60K 35/28* (2024.01); *B60K 2360/166* (2024.01)

(58) Field of Classification Search
CPC ...... B60K 35/00; B60K 35/23; B60K 35/265; B60K 35/28; B60K 2360/166;
(Continued)

(56) References Cited

U.S. PATENT DOCUMENTS

| 2016/0104486 A1* | 4/2016 | Penilla ............... G10L 25/45 704/232 |
| 2019/0133510 A1* | 5/2019 | El Kaliouby .... G08G 1/096725 |

(Continued)

FOREIGN PATENT DOCUMENTS

| CN | 111141299 A | 5/2020 |
| DE | 102011121537 A1 | 6/2013 |

(Continued)

OTHER PUBLICATIONS

International Search Report corresponding to International Patent Application No. PCT/EP2021/070076, dated Oct. 27, 2021. (4 pages).
German Search Report corresponding to German Patent Application No. 10 2020 128 852.2, dated Oct. 15, 2021. (10 pages).
Chinese Office Action corresponding to Chinese Patent Application No. 202180069830.8, dated Jul. 25, 2025 (9 pages).

*Primary Examiner* — Tyler D Paige
(74) *Attorney, Agent, or Firm* — Maginot, Moore & Beck LLP

(57) ABSTRACT

A method controls providing suggestion information to an occupant of a vehicle relating to the performance of a vehicle function for operating the vehicle. The method includes providing a function unit with first input data representative of information relating to the vehicle occupant, the vehicle and/or the surroundings of the vehicle. The function unit determines request information depending on the first input data and the suggestion information. The
(Continued)

request information is provided to a control unit, which determines, depending on the request information, whether the suggestion information should be provided to the vehicle occupant. Responsive to the control unit determining that the suggestion information should be provided, a control command to provide the suggestion information is sent to the function unit using the control unit. A provision command to provide the suggestion information is sent to the vehicle occupant using the function unit depending on the control command.

17 Claims, 3 Drawing Sheets

(51) Int. Cl.
*B60K 35/28* (2024.01)
*B60K 35/26* (2024.01)

(58) Field of Classification Search
CPC ........ B60K 2360/148; B60K 2360/161; B60K 35/10; G01C 21/3697
USPC .......................................................... 701/36
See application file for complete search history.

(56) References Cited

U.S. PATENT DOCUMENTS

| | | | |
|---|---|---|---|
| 2019/0176845 A1* | 6/2019 | Yoon | G06V 20/59 |
| 2020/0141742 A1 | 5/2020 | Mizuno et al. | |
| 2020/0152197 A1* | 5/2020 | Penilla | H04L 67/125 |
| 2020/0207373 A1* | 7/2020 | Kitagawa | G08G 1/00 |
| 2024/0010070 A1* | 1/2024 | Kaluza | G01C 21/3697 |

FOREIGN PATENT DOCUMENTS

| | | |
|---|---|---|
| DE | 102012219923 A1 | 4/2014 |
| DE | 102013217552 A1 | 3/2015 |
| DE | 102015211562 A1 | 12/2016 |
| DE | 102016207447 A1 | 11/2017 |
| DE | 102017001320 A1 | 8/2018 |
| DE | 102017201987 A1 | 8/2018 |
| DE | 102018203426 A1 | 9/2019 |
| JP | 2009023562 A | 2/2009 |
| JP | 2019098780 A | 6/2019 |
| JP | 2020169956 A | 10/2020 |
| WO | 2016157814 A1 | 10/2016 |

* cited by examiner

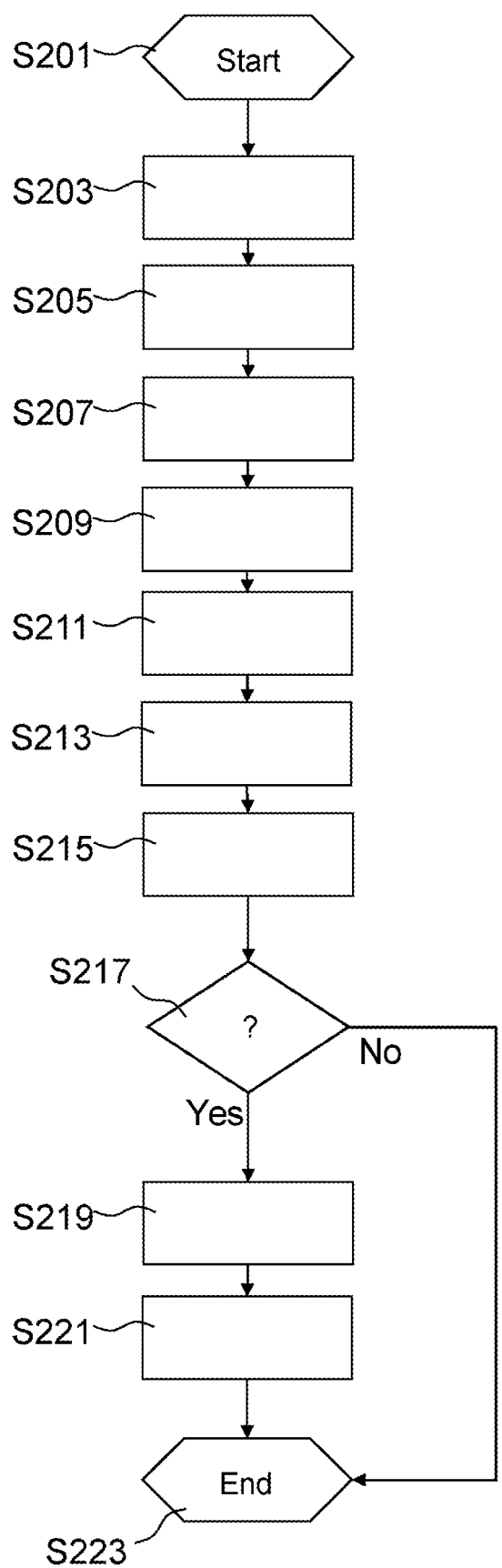

METHOD, DEVICE, COMPUTER PROGRAM AND COMPUTER-READABLE STORAGE MEDIUM FOR CONTROLLING THE PROVISION OF SUGGESTION INFORMATION TO A VEHICLE OCCUPANT OF A VEHICLE

The present application is the U.S. national phase of PCT Application PCT/EP2021/070076 filed on Jul. 19, 2021, which claims priority of German patent application No. 10 2020 128 852.2 filed on Nov. 3, 2020, which is incorporated herein by reference in its entirety.

TECHNICAL FIELD

This disclosure relates to controlling the provision of suggestion information to an occupant of a vehicle.

BACKGROUND

A vehicle may make a suggestion to a vehicle occupant for the performance of a vehicle function for the operation of the vehicle. Furthermore, modern vehicles can have a variety of different vehicle functions.

There is a need for a method that contributes to safe and automated control of the provision of suggestion information to an occupant of a vehicle. In addition, a corresponding device, a corresponding computer program and a computer-readable storage medium should be provided.

SUMMARY

The above-described needs, as well as others, are achieved by embodiments described herein.

A first aspect is characterized by a method for controlling the provision of suggestion information to an occupant of a vehicle.

According to the first aspect, the suggestion information is representative of a suggestion for the performance of a vehicle function for the operation of the vehicle. A function unit is provided with first input data. The first input data are representative of information concerning the vehicle occupant and/or information concerning the vehicle and/or information concerning the surroundings of the vehicle. The function unit is designed to determine the suggestion information. By means of the function unit, request information is determined depending on the first input data and the suggestion information. The request information is representative of a request for the provision of the suggestion information. By means of the function unit, the request information is provided to a control unit. Depending on the request information, the control unit determines whether the suggestion information should be provided to the vehicle occupant. If it is determined by the control unit that the suggestion information should be provided to the vehicle occupant, a control command is sent by means of the control unit to the function unit to provide the suggestion information. Depending on the control command, a provision command is sent by means of the function unit to provide the suggestion information, to display the suggestion information for the vehicle occupant.

The method according to the first aspect may also be used to provide the suggestion information to one or more occupants of the vehicle. For example, the method is extended accordingly for the provision of the suggestion information to the multiple vehicle occupants.

The vehicle may have a digital voice assistant. The digital voice assistant is, for example, designed to perform a command of the vehicle occupant expressed by speech and/or to answer a question of the vehicle occupant expressed by means of speech. In addition, the digital voice assistant can also be designed to conduct complex spoken dialogues with the vehicle occupant and to try to appear as natural or human as possible during such a dialogue with regard to the perception of the vehicle occupant, for example by imitating human behavior. This can, for example, include the detection of wishes and needs of the vehicle occupant. For this purpose, the vehicle may have an interaction unit. For example, the provision command can be sent to this interaction unit. The interaction unit can also be used as an operating interface(so-called "user interface"). For example, the interaction unit comprises one or more input devices and/or one or more output devices.

A respective output device may be a display device of the vehicle, such as a head-up display (HUD) and/or a touch sensitive display device (a so-called "touch display") of the vehicle or the like and/or a loudspeaker of the vehicle or the like. A respective input device may include the touch-sensitive display device of the vehicle and/or any control element of the vehicle and/or a microphone of the vehicle or the like.

The digital voice assistant is designed to interact with the vehicle occupant depending on the interaction unit.

As a result, occupation by the vehicle occupant in the vehicle can be made comfortable. In particular, if the vehicle occupant is a driver of the vehicle, they can be supported by the digital voice assistant in the operation of the vehicle and/or in the operation of the vehicle functions. For example, this may include the suggestion for the performance of the vehicle function at a predetermined time. If the suggestion is submitted to the vehicle independently of a prior request by the occupant, the suggestion may also be referred to as a proactive suggestion. For example, the method according to the first aspect is particularly advantageous if the suggestion information is representative of a proactive suggestion.

The vehicle function for operating the vehicle may comprise any vehicle function of the vehicle. The suggestion information may be representative of any suggestion relating to the performance of vehicle function.

The provision of the suggestion information to the vehicle occupant can also be referred to as the presentation of the suggestion information for the vehicle occupant. The provision may in particular include an acoustic provision, a visual provision, as well as their combination. The acoustic provision includes, for example, a predetermined sound pattern and/or verbal information by the digital voice assistant. Furthermore, the provision can be discreet or dominant with regard to perception by the vehicle occupant.

For example, the suggestion information includes a predetermined set of possible answers by the vehicle occupant. A possible answer can be predetermined by means of a user input of the vehicle occupant depending on the interaction unit, in particular the input device. The possible answer may be representative of acceptance of the suggestion and/or rejection of the suggestion and/or a verbal command for the provision of further information regarding the suggestion.

The provision of the suggestion information may also be interrupted by exceeding a deadline (so-called "time-out") and/or by an interruption (so-called "interrupt"), such as a display of a camera image of a reversing camera of the vehicle on the output device depending on engaging a reverse gear of the vehicle and/or an incoming call. Such an interruption may require the full attention of the vehicle occupant.

For example, the suggestion information is representative of a suggestion for activation and/or deactivation and/or adaptation of the vehicle function or the like. For example, the suggestion information is representative of advice to introduce a pause when operating the vehicle for a long period of time. In particular, in this case, the suggestion information may include location information that is representative of a suitable resting possibility, such as a nearby parking lot or the like.

The method according to the first aspect makes it possible to ensure secure and automated control of the provision of the suggestion information. Furthermore, it is thus possible to centrally control the determination of whether the suggestion information should be provided to the vehicle occupant by means of the control unit. This is particularly advantageous compared to a method in which the determination of whether the suggestion information should be provided to the vehicle occupants is carried out by means of the function unit. Furthermore, a scalable extension of the method according to the first aspect is thereby enabled regarding the provision of multiple items of suggestion information, each of which is representative of the performance of a respective vehicle function. For example, this can relieve the load on multiple function units that are designed to determine the multiple items of suggestion information.

The first input data may include any sensor data and/or actuator data or the like of the vehicle or may be determined depending thereon.

For example, the first input data are provided to the control unit. By means of the control unit, it is determined, depending on the first input data, whether the suggestion information should be provided to the vehicle occupant.

By means of the interaction unit, the control unit is provided with availability information, which is representative of the availability of the respective output devices of the interaction unit. The availability refers to whether a particular output device is available for the provision of the suggestion information or not, for example because other suggestion information may have been provided by means of this or any other output device already or the like. By means of the control unit, it is determined, depending on the availability information, whether the suggestion information should be provided to the vehicle occupant.

This makes it possible to determine by means of the control unit whether the suggestion information can be provided to the vehicle occupant depending on the respective output devices. Furthermore, it is thereby possible to determine by means of the control unit one of the output devices for providing the suggestion information. The control unit can thus be used as a central authority for verifying the availability of the respective output devices of the interaction unit.

The determined output device may depend on the first input data and/or the request information. For example, the request information includes information about which of the output devices is suitable for providing the suggestion information. This makes it possible to determine the determined output device according to the vehicle function represented by the suggestion information.

For example, the control command includes information about the determined output device. For example, the provision command includes the information regarding the determined output device. In this case, the presentation of the suggestion information is carried out depending on the information concerning the determined output device. The provision command can be received by the interaction unit.

The presentation of the suggestion information can include both the acoustic provision and the visual provision, as well as their combination. For example, the presentation of the suggestion information may also include a vibration of a steering wheel of the vehicle and/or may be carried out depending on the interior lighting of the vehicle.

Following the presentation of the suggestion information, feedback information can be provided to the control unit. The feedback information is representative of a response and/or a reaction by the vehicle occupant to the provision of the suggestion information. The feedback information can be determined by the interaction unit. The feedback information can first be provided to the function unit and forwarded from there to the control unit.

For example, the feedback information can be determined depending on or based on exceeding the time limit and/or the interruption. In this case, for example, exceeding the time limit may be representative of a lack of interest on the part of the vehicle occupant in relation to the suggestion represented by the suggestion information.

The control unit can thus be used as a central instance for the collection of feedback information. As a result, an analysis and/or a determination of an optimization potential can be carried out by the control unit, in particular at runtime. The control unit can, so to speak, "learn" depending on the feedback information.

For example, the control unit may have been provided with suggestion density information. The suggestion density information is representative of a predetermined amount of suggestion information provided to the vehicle occupant in a predetermined period of time. The suggestion density information can be determined by the control unit and adjusted adaptively, for example depending on previously provided feedback information and/or the first input data or the like. By means of the control unit it is determined depending on the suggestion density information whether the suggestion information should be provided to the vehicle occupant.

This makes it possible to control the provision of the suggestion information by means of the control unit in such a way that the occupation of the vehicle by the vehicle occupant is made comfortable.

For example, by means of the control unit it is determined whether the suggestion information should be provided to the vehicle occupant depending on the request information and/or the first input data and/or the availability information and/or the suggestion density information.

In addition, the determination of whether the suggestion information should be provided to the vehicle occupant can also be carried out depending on a user input of the vehicle occupant. This allows a user setting of the vehicle occupant to be taken into account. For example, the user input is representative of the activation of a "do not disturb" setting, which manually deactivates the provision of suggestion information.

By the method according to the first aspect, for example, the attention of the vehicle occupant can be influenced and/or traffic safety when operating the vehicle can be increased.

According to an optional embodiment of the first aspect, the control unit is provided with further request information. The further request information is representative of a request to provide further suggestion information. By means of the control unit, it is determined whether the suggestion information should be provided to the vehicle occupant depending on the request information and the further request information.

The further suggestion information is representative of a suggestion for the performance of a further vehicle function for the operation of the vehicle. The further suggestion information and the further request information are determined, for example, by a further function unit.

This makes it possible to scale the method according to the first aspect arbitrarily and to extend it for a variety of vehicle functions for operating the vehicle. Furthermore, as a result it is possible to avoid the provision of content-related suggestion information. This is particularly advantageous compared to the method with which the determination of the provision of the suggestion information is carried out by means of the function unit and the determination of the provision of the further suggestion information is carried out by means of the further function unit.

For example, the content correlation is representative of the fact that the suggestion information and the further suggestion information are representative of redundant performance of the vehicle function and/or for redundant rectification of a need, such as "Boredom".

The further request information or the further suggestion information can have the same properties as the aforementioned request information or the aforementioned suggestion information.

According to a further optional embodiment of the first aspect, the request information includes first time information. The first time information is representative of a first time at which the suggestion information should be provided to the vehicle occupant. If it is determined by the control unit that the suggestion information should be provided to the vehicle occupant, the suggestion information is provided to the vehicle occupant at the first time.

In this way, it is possible to determine by means of the control unit, depending on the first time information provided by the function unit, whether the suggestion information should be provided to the vehicle occupant at the first time. Thus, provision in a critical period and/or at a critical time, such as during a telephone call of the vehicle occupant and/or during the operation of the vehicle on an acceleration lane of a motorway, can be avoided.

The critical period and/or the critical time can be determined, for example, depending on the first input data.

For example, the further request information includes further time information. This makes it possible to avoid providing time-correlating suggestion information. For example, the temporal correlation is representative of the fact that at the further time provision of the suggestion information has not yet been finalized or the like. Thus, a simultaneous and/or a temporally overlapping provision of the suggestion information and the further suggestion information can be prevented.

According to a further optional embodiment of the first aspect, the request information includes impact information. The impact information is representative of an effect on a current state of the vehicle occupant. The effect on the current state of the vehicle occupant can be caused by the performance of the vehicle function according to the suggestion information. Depending on the request information, the control unit determines whether the
suggestion information should be provided to the vehicle occupant by first specifying target state information. The target state information is representative of a predetermined target state of the vehicle occupant. In addition, state information is determined depending on second input data. The state information is representative of the current state of the vehicle occupant. Depending on the target state information, the state information and the impact information, it is determined whether the suggestion information should be provided to the vehicle occupant.

The current state of the vehicle occupant includes a current emotion of the vehicle occupant and/or a current situation regarding the vehicle occupant.

For example, the current emotion is representative of "fatigue", "boredom", "tension", "stress" or the like. For example, the current situation is representative of a need of the vehicle occupant and/or of a predetermined period of time until arrival at a predetermined destination when operating the vehicle or the like.

The predetermined state of the vehicle occupant includes a predetermined emotion of the vehicle occupant and/or a predetermined situation with regard to the vehicle occupant. The predetermined state of the vehicle occupant is representative of an optimal state of the occupant with regard to their emotion and/or situation. The predetermined state of the vehicle occupant can be predetermined statically or dynamically. For example, this is predetermined by a development engineer. The predetermined state of the vehicle occupant can be predetermined specifically for the respective vehicle occupant or for a group of persons to which the vehicle occupant belongs.

This makes it possible to control the control unit in an orchestrated manner. Furthermore, this makes it possible to determine whether the suggestion information should be provided to the vehicle occupant in such a way that when the vehicle function is performed according to the suggestion information, a current state of the vehicle occupant essentially corresponds to the predetermined target state of the vehicle occupant.

Furthermore, a deviation of the current state from the predetermined target state of the vehicle occupant can be determined.

As a result, for example, the current emotion of the vehicle occupant can be continuously improved during iterative performance of the method compared to the method with which the determination of the provision of the suggestion information is carried out by means of the function unit. Furthermore, this can contribute to the satisfaction of the vehicle occupant when operating the vehicle. As a result, the attention of the vehicle occupant can be influenced and/or road safety when operating the vehicle can be improved.

The second input data are representative of further information concerning the vehicle occupant and/or further information concerning the vehicle and/or further information regarding the surroundings of the vehicle. The second input data have the same properties as the aforementioned first input data. The second input data can be identical to the first input data. Alternatively, they are not identical.

The second input data are in particular determined depending on an interior camera of the vehicle and/or a thermal imaging camera of the vehicle and/or an infrared camera of the vehicle and/or an acoustic sensor of the vehicle or the like.

In addition or alternatively, the second input data are representative of interactions of all occupants of the vehicle, such as a driving behavior of the vehicle occupant and/or an interaction of the vehicle occupant with the interaction unit or the like.

The further information regarding the surroundings of the vehicle includes, for example, a traffic density and/or information concerning a traffic situation or the like.

In addition or alternatively, the second input data are representative of a parameter when operating the vehicle, such as a predicted time until arrival at the predetermined destination compared to an appointment entry in a calendar of the vehicle occupant or the like.

In addition or alternatively, the second input data are representative of an expected traffic situation and/or a significant expected change in weather conditions in a geographical region in which the vehicle is being operated.

The current situation with regard to the vehicle occupant is representative of all the information contained in the second input data.

The effect on the current state of the vehicle occupant includes an effect on the current emotion of the vehicle occupant and/or an effect on the current situation with regard to the vehicle occupant. The effect according to the impact information is in particular representative of an expected effect on the current state of the vehicle occupant.

The effect represented by the impact information can be formed statically or dynamically. The impact information may be provided specifically for the respective vehicle occupant or for a group of persons to which the vehicle occupant belongs.

For example, it is then determined in particular that the suggestion information should be provided to the vehicle occupant if, based on the current state of the vehicle occupant, the effect on the current state represented by the impact information is suitable to substantially achieve the predetermined target state.

For example, the feedback information in this case is representative of an actually determined effect on the current state of the vehicle occupant caused by the performance of the vehicle function in accordance with the suggestion information. For example, the impact information is adjusted depending on the feedback information.

For example, the further request information includes further impact information which is representative of an effect on a current state of the vehicle occupant, which can be caused by the performance of the further vehicle function according to the further suggestion information. In this case, it is determined whether the suggestion information should be provided to the vehicle occupant depending on the target state information, the state information, the impact information and the further impact information. For example, in this case it can also be determined that the suggestion information and the further suggestion information should be provided to the vehicle occupant.

For example, the function unit can be provided with the state information by means of the control unit. In this case, it can be determined by means of the function unit when the request information is provided to the control unit.

For example, the provision of respective request information to all function units of the vehicle or a subset of all function units of the vehicle is carried out at a third time. This makes it possible to determine by means of the control unit whether one or more items of suggestion information should be provided to the vehicle occupant according to the respective request information.

According to a further optional embodiment of the first aspect, it is determined depending on the target state information, the state information and the impact information, whether the suggestion information should be provided to the vehicle occupant in such a way that second time information is determined depending on the target state information, the state information and the impact information. The second time information is representative of a second time at which the suggestion information should be provided to the vehicle occupant. If it is determined by the control unit that the suggestion information should be provided to the vehicle occupant, the suggestion information is provided to the occupant of the vehicle at the second time.

The third time is arranged before the second time.

This makes it possible to determine, depending on the second time information determined by means of the control unit, whether the suggestion information should be provided to the vehicle occupant at the second time. Thus, provision in a critical period of time and/or at a critical time can be avoided.

Furthermore, the control unit can thereby determine the second time of the provision of the suggestion information.

According to a further optional embodiment of the first aspect, the control unit is provided with preference information. The preference information is representative of a preference of the vehicle occupant in a respective state for the performance of a respective vehicle function. Depending on the target state information, the state information, the impact information and the preference information, it is determined whether the suggestion information should be provided to the vehicle occupant.

This makes it possible to determine whether the suggestion information should be provided to the vehicle occupant, additionally depending on the preference information.

For example, the vehicle occupant in a state of "boredom" has a preference for the performance of a vehicle function to activate a sport mode of the vehicle.

For example, the preference information may be determined depending on the first input data and/or the second input data.

The method according to the first aspect and its optional embodiments can be extended accordingly for further occupants of the vehicle.

For example, the method according to the first aspect and its optional embodiments is particularly advantageous when it is carried out iteratively.

A second aspect is characterized by a device for controlling the provision of suggestion information to an occupant of a vehicle. The device is designed to carry out the method for controlling the provision of suggestion information to an occupant of a vehicle according to the first aspect.

A third aspect is characterized by a computer program, wherein the computer program includes instructions which, when the computer program is executed by a computer, cause the computer to control the provision of suggestion information to an occupant of a vehicle according to the first aspect.

A fourth aspect is characterized by a computer-readable storage medium on which the computer program according to the third aspect is stored.

Optional embodiments of the first aspect may also be present accordingly with the other aspects and may have corresponding effects.

Exemplary embodiments are explained in more detail below on the basis of the schematic drawings.

BRIEF DESCRIPTION OF THE DRAWINGS

FIG. 3 shows a flowchart of a second program for controlling the provision of suggestion information to an occupant of a vehicle.

DETAILED DESCRIPTION

Elements of the same design or function are marked with the same reference signs across the figures.

Figure 1:
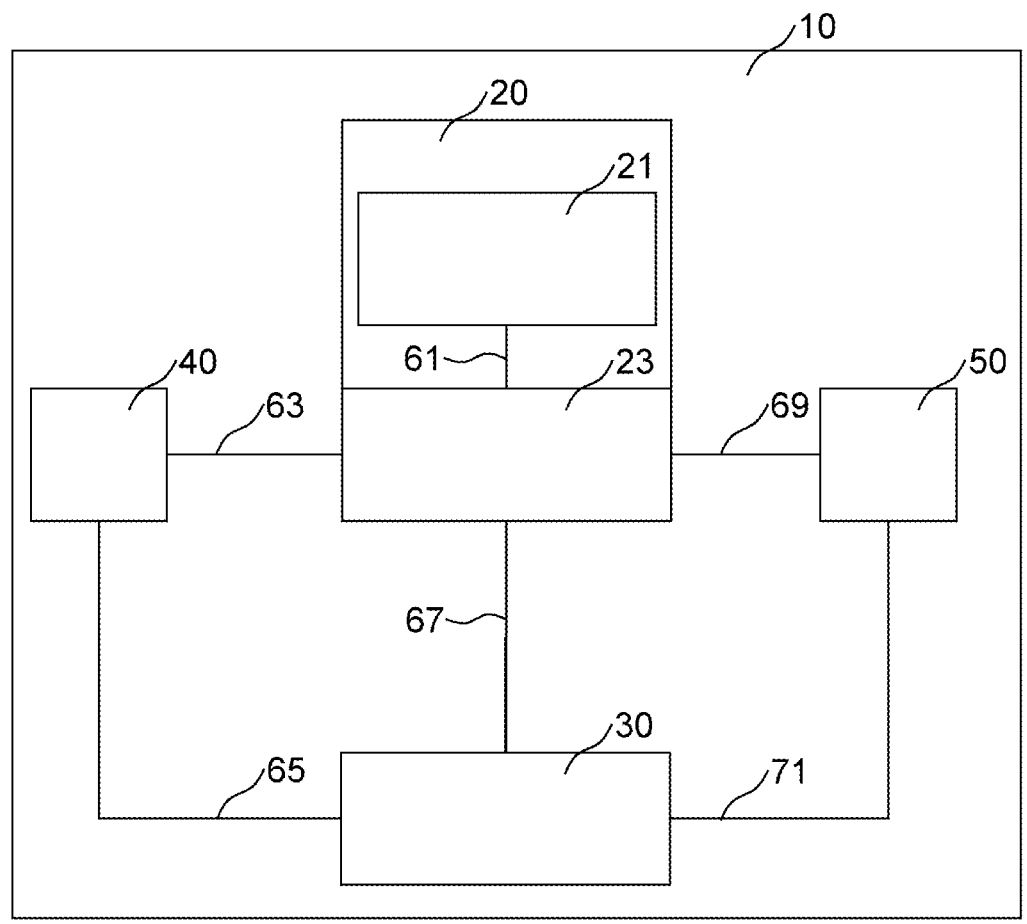
FIG. 1 shows a schematic drawing of a device 10 for controlling the provision of suggestion information to an occupant of a vehicle.

FIG. 1 shows a schematic drawing of a device for controlling the provision of suggestion information to an occupant of a Vehicle.

The device 10 comprises a function unit 20, a control unit 30, a processing unit 40 and an interaction unit 50. The function unit 20 has a function performance unit 21 and a function control unit 23.

For example, the device 10 is arranged in a vehicle. For example, the vehicle may comprise a plurality of function units 20, which are designed accordingly.

The function performance unit 21 may be designed to perform a vehicle function for operating the vehicle.

The function control unit 23 may be designed to determine suggestion information which is representative of a suggestion, in particular a proactive suggestion, for the performance of the vehicle function for operating the vehicle. The function control unit 23 can be designed to determine request information. The function control unit 23 may be designed to determine first time information.

The processing unit 40 may be designed to determine first input data which are representative of information relating to an occupant of the vehicle and/or information relating to the vehicle and/or information relating to the surroundings of the vehicle.

The processing unit 40 may be designed to determine second input data which are representative of further information relating to the vehicle occupant and/or further information relating to the vehicle and/or further information relating to the vehicle and/or further Information relating to the surroundings of the vehicle.

The interaction unit 50 may be designed to present the suggestion information for the vehicle occupant. For example, the interaction unit 50 comprises one or more input devices and/or one or more output devices. A respective output device may be a display device of the vehicle, such as a head-up display (HUD) and/or a touch-sensitive display device (so-called "touch display") of the vehicle or the like and/or a loudspeaker of the vehicle or the like. A respective input.

Device may include a touch sensitive display device of the vehicle and/or any control element of the vehicle and/or a microphone of the vehicle or the like.

The function performance unit 21 has a signaling coupling to the function control unit 23 via a first communication link 61. The function unit 20, in particular the function control unit 23, has a signaling coupling to the processing unit 40 via a second communication link 63. The control unit 30 has a signaling coupling to the processing unit 40 via a third communication link 6. The function unit 20 has a signaling coupling to the control unit 30 via a fourth communication link 67. The function unit 20, in particular the function control unit 23, has a signaling coupling to the interaction unit 50 via a fifth communication link 69. The interaction unit 50 has a signaling coupling to the control unit 30 via a sixth communication link 71.

The first input data may be provided to the function unit 20, in particular the function control unit 23, depending on the second communication link 63.

The first input data can be provided to the control unit depending on the third communication link 65.

The second input data can be provided to the control unit 30 depending on the third communication link 65.

The function unit 20, in particular the function control unit 23, can send a provision command to the interaction unit 50 to provide the suggestion information depending on the fifth communication link 69.

The function unit 23 can send a performance command to perform the vehicle function to the function performance unit 21 depending on the first communication link 61.

The function unit 20, in particular the function control unit 23, may provide the request information to the control unit 30 depending on the fourth communication link 67.

The control unit 30 may send a control command to provide the suggestion information to the function unit 20, in particular the function control unit 23, depending on the fourth communication link 67.

The interaction unit 50 may provide the control unit 30 with availability information depending on the sixth communication link 71.

The interaction unit 50 may provide the function unit 20, in particular the function control unit 23, with feedback information depending on the fifth communication link 69.

The function unit 20, in particular the function control unit 23, may provide the control unit 30 with feedback information depending on the fourth communication link 67.

Each of the aforementioned units may be in the form of a hardware unit and/or a software unit. Furthermore, each of the aforementioned units may be in the form of one or more units.

Figure 2:
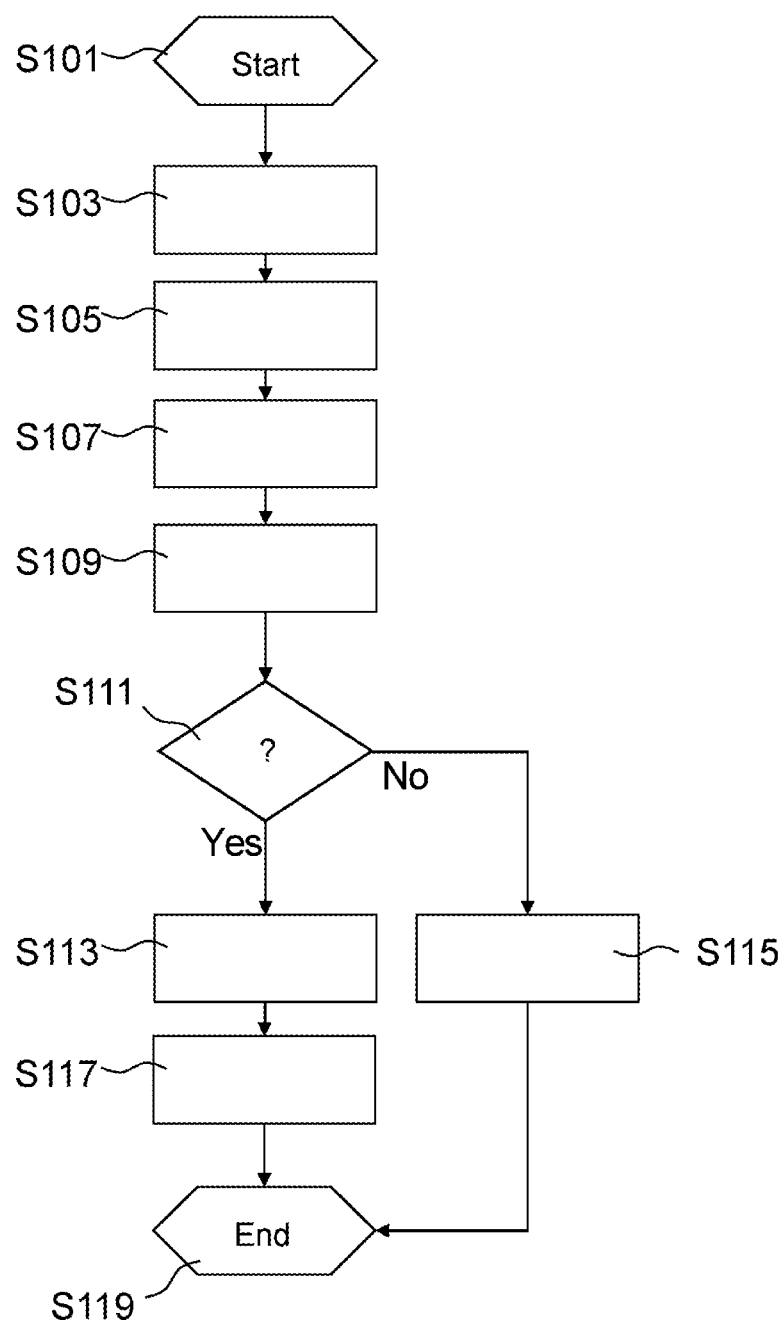
FIG. 2 shows a flowchart of a first program for controlling the provision of suggestion information to an occupant of a vehicle.

FIG. 2 shows a flowchart of a first program for controlling the provision of suggestion information to an occupant of a vehicle.

The first program may, in particular, be carried out by a first device. For this purpose, the first device comprises in particular a first computing unit, a first program memory and a first data memory, and, for example, one or more first communication interfaces. The first program and first data memories and/or the first computing unit and/or the first communication interfaces may be in the form of one unit and/or distributed over multiple units.

The first device may also be referred to as a device 10 for controlling the provision of suggestion information to an occupant of a vehicle.

In particular, for this purpose the first program is stored on the first program memory and the first data memory of the first device.

The first program is started in a step S101, in which variables may be initialized if appropriate.

In a step S103, the function unit is provided with first input data. The first input data are representative of information concerning an occupant of a vehicle and/or information concerning the vehicle and/or information concerning the surroundings of the vehicle.

In a step S105 request information is determined is by means of the function unit 20 depending on the first input data and suggestion information. The request information is representative of a request for the provision of the suggestion information.

The function unit 20 is designed to determine the suggestion information. The suggestion information is representative of a suggestion for the performance of a vehicle function for the operation of the vehicle.

In a step S107, the request information is provided to the control unit 30 by means of the function unit 20.

Optionally, in a step S107, the request information includes first time information. The first time information is representative of a first time at which the suggestion information should be provided to the vehicle occupant.

In an optional step S109, the control unit 30 is provided with further request information. The further request information is representative of a request to provide further suggestion information.

In a step S111 it is determined by means of the control unit 30 whether the suggestion information should be provided to the vehicle occupant depending on the request information.

If this is the case, the processing of the first program is continued in a step S113. Otherwise, the processing of the first program is continued in an optional step S115 or is terminated in a step S119.

The control unit 30 is provided by means of the interaction unit 50 with availability information which is representative of the availability of the respective output devices of the interaction unit 50. By means of the control unit 30 it is determined, depending on the availability information, whether the suggestion information should be provided to the vehicle occupant.

For example, the availability information is representative of the fact that the loudspeaker of the vehicle is not available due to a telephone call. For example, the availability information is representative of the fact that the display device of the vehicle is deactivated and therefore not available.

Suggestion density information is determined by means of the control unit 30.

For example, depending on the request information and the first input data and the availability information and the suggestion density information, it is determined by means of the control unit 30 whether the suggestion information should be provided to the vehicle occupant.

Optionally, in the step S111 it is determined by means of the control unit 30 whether the suggestion information should be provided to the vehicle occupant depending on the request information and the further request information.

In the step S113 a control command to provide the suggestion information is sent to the function unit 20 by means of the control unit 30.

Optionally, in the step S113, the control command is sent in such a way that the suggestion information is provided to the occupant of the vehicle at the first time.

In a step S117, depending on the control command a provision command to provide the suggestion information is sent by means of the function unit 20 to present the suggestion information for the vehicle occupant.

Optionally, in the step S117 following the presentation of the suggestion information, feedback information is determined by the interaction unit 50. The feedback information is representative of a response and/or a reaction of the occupant to the provision of the suggestion information.

Optionally, in the step S117 following the presentation of the suggestion information a performance command is determined by means of the function unit 20 depending on the feedback information. Depending on the performance command, the vehicle function for operating the vehicle is performed.

In the optional step S115, the control unit 30 sends a further control command to the function unit 20 that is representative of the fact that that the suggestion information should not be provided to the vehicle occupant. For example, the further control command includes the availability information.

Following step S117 or step S115, the first program is terminated in step S119 and can be started again in step S101 if appropriate.

FIG. 3 shows a flowchart of a second program for controlling the provision of suggestion information to an occupant of a vehicle.

The second program may be carried out in particular by a second device. For this purpose, the second device has in particular a second computing unit, a second program memory and a second data memory, and, for example, one or more second communication interfaces. The second program memory and the second data memory and/or the second computing unit and/or the second communication interfaces may be in the form of one unit and/or distributed over multiple units. The second device may also be referred to as a device 10 for controlling the provision of suggestion information to an occupant of a vehicle.

For this purpose, in particular, the second program is stored on the second program memory and second data memory of the second device.

The second program is particularly suitable for iterative performance. For example, the iterative performance of the second program can be representative of a continual process.

The second program is started in a step S201, in which variables can be initialized if appropriate.

Steps S203 and S205 are performed according to steps S103 and S105 of the first program.

In a step S207 the request information is provided to the control unit 30 by means of the function unit 20.

Optionally, in step S207 the request information includes impact information. The impact information is representative of an effect on the current state of the vehicle occupant. The effect on the current state of the vehicle occupant can be caused by the performance of the vehicle function according to the suggestion information.

For example, the impact information includes multiple first parameters. A respective first parameter is representative of a respective effect on a respective predetermined target state which can be caused by the performance of the vehicle function according to the suggestion information. For example, a plurality of states is predetermined, in particular by a design engineer.

For example, the vehicle function according to the suggestion information is representative of a first vehicle function for playing music or messages. The effect which can be caused by the performance of the first vehicle function is particularly advantageous if the current state of the vehicle occupant according to the state information is representative of "boredom".

For example, the vehicle function according to the suggestion information is representative of a second vehicle function for seat massage. The effect that can be caused by the performance of the second vehicle function is particularly advantageous if the current state of the vehicle occupant according to the state information is representative of "stress".

For example, the vehicle function according to the suggestion information is representative of a third vehicle function for target route adaptation. This would be advantageous, for example, in a predetermined target state, which is representative of "timely arrival at a destination".

An optional step S209 is carried out according to the optional step S109 of the first program.

In an optional step S211, the control unit 30 is provided with preference information. The preference information is representative of a preference of the vehicle occupant in a predetermined state for the performance of a respective vehicle function.

In a step S213, target state information is predetermined. The target state information is representative of a predetermined target state of the vehicle occupant.

For example, the target state information includes multiple second parameters. A respective second parameter is representative of a respective predetermined target state with regard to a respective predetermined state.

In a step S215, state information is determined depending on second input data. The state information is representative of a current state of the vehicle occupant.

For example, the state information includes multiple third parameters. A respective third parameter is representative of a respective current state according to the state information regarding a respective one of the predetermined states.

In a step S217, depending on the target state information, the state information and the impact information, it is determined whether the suggestion information should be provided to the vehicle occupant.

For example, step S217 is performed quasi-permanently in the ongoing process.

If this is the case, the processing of the first program is continued in a S219. Otherwise, the processing of the first program is terminated in a step S223.

The step S219 can be extended according to the step S111 of the first program.

For example, the control unit 30 is provided with the availability information by means of the interaction unit 50. By means of the control unit 30 it is determined whether the suggestion information should be provided to the vehicle occupant depending on the availability information.

For example, suggestion density information is determined by means of the control unit 30.

Optionally, in the step S217 second time information is determined depending on the target state information, the state information and the impact information. The second time information is representative of a second time at which the suggestion information should be provided to the vehicle occupant. For example, this can be extended in the context of the iterative performance of the second program in such a way that the time at which the suggestion information should be provided to the vehicle occupant is essentially determined on an ongoing basis. This can also be referred to as quasi-permanent performance.

Optionally, in the step S217 it is determined whether the suggestion information should be provided to the vehicle occupant depending on the target state information, the state information, the impact information and the preference information.

In the step S219 a control command to provide the suggestion information is sent to the function unit 20 by means of the control unit 30.

Optionally, in the step S219 the control command is sent in such a way that the suggestion information is provided to the occupant of the vehicle at the second time.

A step S221 is performed according to the step S117 of the first program.

Optionally, in the step S221 the feedback information is representative of an actually determined effect on the current state of the vehicle occupant, which is caused by the performance of the vehicle function according to the suggestion information. For example, the feedback information for deriving knowledge about the provision of the suggestion information can be carried out in a more targeted or effective manner in a further performance of the second program. The control unit 30 can, so to speak, "learn" depending on the feedback information. Such "learning" can be carried out individually depending on the vehicle as well as one or more occupants of the vehicle. Additionally or alternatively, such "learning" can take place depending on a large number of further vehicle occupants of respective further vehicles (so-called "crowd-learning" or "crowd-based-learning"). For this purpose, for example, corresponding further, possibly anonymized, feedback information may be provided. For example, the impact information is adjusted by means of the function unit 20 and/or the control unit 30 depending on the feedback information.

Following the step S221, the second program is terminated in the step S223 and, if appropriate, can be restarted in step S201.

The implementation of the second program may allow orchestrating control of the control unit 30. The sequential implementation of the second program described above can also be adapted accordingly. For example, the steps of the second program can be performed in such a way that it is determines on an ongoing basis when the suggestion information should be provided to the vehicle occupant. For example, the control unit 30 is provided with all request information, which represents respective suggestion information, of all function units of the vehicle and the control unit 30 determines when the vehicle occupant or the multiple vehicle occupants should be provided with which suggestion information. The performance of the second program may be caused or triggered by different means. For example, this can be carried out depending on a cyclic timer and/or depending on a change in a surroundings variable of the vehicle and/or depending on a change in an emotion of the vehicle occupant and/or depending on a change in an input parameter of the vehicle and/or depending on an availability of a vehicle function of the vehicle and/or depending on exceeding or falling below one or more threshold values self-managed by means of the control unit 30 and/or depending on the expiry of a reminder timer self-managed by means of the control unit 30 and/or the expiry of another timer.

The surroundings variable and/or the emotion and/or the input parameter may be part of the first input data and/or the second input data.

The invention claimed is:

1. A method for controlling provision of suggestion information to an occupant of a vehicle, wherein the suggestion information is representative of a suggestion for performance of a vehicle function for operating the vehicle, the method comprising:

providing a function unit with first input data from at least one of a vehicle sensor, a vehicle camera, and a vehicle actuator, wherein the first input data is representative of information relating to the vehicle occupant and/or information relating to the vehicle and/or information relating to surroundings of the vehicle, wherein the function unit includes a function performance unit configured to perform a vehicle function for operating the vehicle, determining, using the function unit, the suggestion information depending at least in part on the first input data, determining request information, using the function unit, depending on the first input data and the suggestion information, wherein the request information is representative of a request for the provision of the suggestion information, the request information including impact information representative of an effect on a current state of the vehicle occupant, wherein the effect can be caused by the performance of the vehicle function according to the suggestion information;
providing the request information to a control unit using the function unit,
determining using the control unit, depending on the request information, whether the suggestion information should be provided to the vehicle occupant, wherein determining whether the suggestion information should be provided to the vehicle occupant includes:
   determining state information depending on second input data, wherein the state information is representative of the current state of the vehicle occupant, and wherein the second input data is received from at least one of the vehicle sensor and the vehicle camera, and
   determining whether the suggestion information should be provided to the vehicle occupant depending on target state information, the state information and the impact information, wherein the target state information is representative of a predetermined target state of the vehicle occupant,
responsive to the control unit determining that the suggestion information should be provided to the vehicle occupant, sending a control command to provide the suggestion information to the function unit using the control unit, and
sending a provision command to provide the suggestion information for presenting the suggestion information to the vehicle occupant using the function unit depending on the control command.

2. The method as claimed in claim 1, further comprising:
providing the control unit with further request information, wherein the further request information is representative of a request to provide further suggestion information, and
determining using the control unit, depending on the request information and the further request information, whether the suggestion information should be provided to the vehicle occupant.

3. The method as claimed in claim 1, wherein determining whether the suggestion information should be provided to the vehicle occupant further comprises:
determining, depending on the target state information, the state information and the impact information, second time information that is representative of a second time at which the suggestion information should be provided to the vehicle occupant, and
if it is determined by the control unit that the suggestion information should be provided to the vehicle occupant, then providing the suggestion information to the vehicle occupant at the second time.

4. The method as claimed in claim 3, wherein:
the control unit is provided with preference information that is representative of a preference of the vehicle occupant in a respective state for the performance of a respective vehicle function, and
depending on the target state information, the state information, the impact information and the preference information, it is determined whether the suggestion information should be provided to the vehicle occupant.

5. The method as claimed in claim 1, wherein:
the control unit is provided with preference information that is representative of a preference of the vehicle occupant in a respective state for the performance of a respective vehicle function, and
depending on the target state information, the state information, the impact information and the preference information, it is determined whether the suggestion information should be provided to the vehicle occupant.

6. The method as claimed in claim 1, wherein the request information includes first time information which is representative of a first time at which the suggestion information should be provided to the vehicle occupant, and if it is determined by the control unit that the suggestion information should be provided to the vehicle occupant, then the suggestion information is provided to the occupant of the vehicle at the first time.

7. The method as claimed in claim 6, wherein:
the request information includes impact information which is representative of an effect on a current state of the vehicle occupant, wherein the effect can be caused by the performance of the vehicle function according to the suggestion information; and
determining whether the suggestion information should be provided to the vehicle occupant further comprises,
   determining state information depending on second input data, wherein the state information is representative of a current state of the vehicle occupant, and
   determining whether the suggestion information should be provided to the vehicle occupant depending on target state information, the state information and the impact information, wherein the target state information is representative of a predetermined target state of the vehicle occupant.

8. The method as claimed in claim 7, wherein determining whether the suggestion information should be provided to the vehicle occupant further comprises:
determining, depending on the target state information, the state information and the impact information, second time information that is representative of a second time at which the suggestion information should be provided to the vehicle occupant, and
if it is determined by the control unit that the suggestion information should be provided to the vehicle occupant, then providing the suggestion information to the vehicle occupant at the second time.

9. The method as claimed in claim 8, wherein:
the control unit is provided with preference information that is representative of a preference of the vehicle occupant in a respective state for the performance of a respective vehicle function, and
depending on the target state information, the state information, the impact information and the preference information, it is determined whether the suggestion information should be provided to the vehicle occupant.

10. The method as claimed in claim 7, wherein:
the control unit is provided with preference information that is representative of a preference of the vehicle occupant in a respective state for the performance of a respective vehicle function, and
depending on the target state information, the state information, the impact information and the preference information, it is determined whether the suggestion information should be provided to the vehicle occupant.

11. A device for controlling the provision of suggestion information to an occupant of a vehicle, which is designed to carry out the method as claimed in claim 10.

12. The device as claimed in claim 11, wherein:
the request information includes impact information which is representative of an effect on a current state of the vehicle occupant, wherein the effect can be caused by the performance of the vehicle function according to the suggestion information; and
determining whether the suggestion information should be provided to the vehicle occupant further comprises,
determining state information depending on second input data, wherein the state information is representative of a current state of the vehicle occupant, and
determining whether the suggestion information should be provided to the vehicle occupant depending on target state information, the state information and the impact information, wherein the target state information is representative of a predetermined target state of the vehicle occupant.

13. A computer program, wherein the computer program includes instructions which, when the program is executed by a computer, cause the computer to carry out the method as claimed in claim 1.

14. The computer program as claimed in claim 13, wherein:
the request information includes impact information which is representative of an effect on a current state of the vehicle occupant, wherein the effect can be caused by the performance of the vehicle function according to the suggestion information; and
determining whether the suggestion information should be provided to the vehicle occupant further comprises,
determining state information depending on second input data, wherein the state information is representative of a current state of the vehicle occupant, and
determining whether the suggestion information should be provided to the vehicle occupant depending on target state information, the state information and the impact information, wherein the target state information is representative of a predetermined target state of the vehicle occupant.

15. A computer-readable storage medium on which the computer program as claimed in claim 14 is stored.

16. A computer-readable storage medium on which the computer program as claimed in claim 13 is stored.

17. The method of claim 1 wherein the function unit is a vehicle function unit comprising a function performance unit and a function control unit, wherein the function performance unit is configured to perform a vehicle function for operating the vehicle, and wherein the function control unit is configured to determine the suggestion information and determine the request information.

* * * * *